(12) United States Patent
Scott

(10) Patent No.: US 7,039,828 B1
(45) Date of Patent: May 2, 2006

(54) SYSTEM AND METHOD FOR CLUSTERED FAILOVER WITHOUT NETWORK SUPPORT

(75) Inventor: John A. Scott, Cary, NC (US)

(73) Assignee: Network Appliance, Inc., Sunnyvale, CA (US)

( * ) Notice: Subject to any disclaimer, the term of this patent is extended or adjusted under 35 U.S.C. 154(b) by 511 days.

(21) Appl. No.: 10/086,657

(22) Filed: Feb. 28, 2002

(51) Int. Cl.
 *G06F 11/00* (2006.01)
(52) U.S. Cl. .................... 714/4; 709/227; 709/228
(58) Field of Classification Search ............. 714/4, 714/43; 709/227, 228
See application file for complete search history.

(56) References Cited

U.S. PATENT DOCUMENTS

| | | | |
|---|---|---|---|
| 4,937,763 A | 6/1990 | Mott | |
| 5,067,099 A | 11/1991 | McCown et al. | |
| 5,157,663 A | 10/1992 | Major et al. | |
| 5,163,131 A | 11/1992 | Row et al. | |
| 5,355,453 A | 10/1994 | Row et al. | |
| 5,485,579 A | 1/1996 | Hitz et al. | |
| 5,633,999 A * | 5/1997 | Clowes et al. | 714/6 |
| 5,781,770 A | 7/1998 | Byers et al. | |
| 5,796,934 A * | 8/1998 | Bhanot et al. | 714/4 |
| 5,802,366 A | 9/1998 | Row et al. | |
| 5,812,748 A | 9/1998 | Ohran et al. | |
| 5,812,751 A | 9/1998 | Ekrot et al. | |
| 5,819,292 A | 10/1998 | Hitz et al. | |
| 5,931,918 A | 8/1999 | Row et al. | |
| 5,941,972 A | 8/1999 | Hoese et al. | |
| 5,951,695 A | 9/1999 | Kolovson | |
| 5,963,962 A | 10/1999 | Hitz et al. | |
| 6,065,037 A | 5/2000 | Hitz et al. | |
| 6,119,244 A | 9/2000 | Schoenthal et al. | |
| 6,173,312 B1 * | 1/2001 | Atarashi et al. | 709/203 |
| 6,289,356 B1 | 9/2001 | Hitz et al. | |
| 6,292,905 B1 | 9/2001 | Wallach et al. | |
| 6,425,035 B1 | 7/2002 | Hoese et al. | |
| 6,625,749 B1 | 9/2003 | Quach | |
| 6,728,897 B1 | 4/2004 | Cramer et al. | |
| 6,745,241 B1 * | 6/2004 | French et al. | 709/221 |
| 6,775,702 B1 | 8/2004 | Oeda et al. | |
| 2002/0071386 A1 * | 6/2002 | Gronke | 370/217 |
| 2002/0112022 A1 | 8/2002 | Kazar et al. | |
| 2002/0116593 A1 | 8/2002 | Kazar et al. | |
| 2003/0033412 A1 * | 2/2003 | Sundaresan et al. | 709/227 |

OTHER PUBLICATIONS

Yuanyuan Zhou, Peter M. Chen, Kai Li, "Fail Cluster Failover Using Virtual Memory-Mapped Communication," May 1999, ACM.*

(Continued)

*Primary Examiner*—Scott Baderman
*Assistant Examiner*—Paul F. Contino
(74) *Attorney, Agent, or Firm*—Cesari and McKenna, LLP

(57) ABSTRACT

A system and method for clustered failover over transport media that does not support moving of transport addressed between network interface controllers is provided. This reviving file server of a cluster, upon detection of the failure of its partner, assumes ownership of the disks owned by the failed file server. The surviving file server activates a secondary discriminator or port for access by clients who normally utilized the failed file server. Clients generate the name of the surviving or failover file server by appending at set item to the name of the failed file server.

41 Claims, 7 Drawing Sheets

OTHER PUBLICATIONS

Plummer, David C. An Ethernet Address Resolution Protocol or Converting Network Protocol Addresses to 48, bit Ethernet Address for Transmission on Ethernet Hardware. Nov. 1982. Jun. 3, 2002. http://www.ietf.org/rfc/rfc0826.txt?number-826.

Virtual Interface Architecture Specification, Version 1.0, Dec. 16, 1997. Compaq Comuter Corp., Intel Corporation, Microsoft Corporation.

American National Standard for Information Technology, FIBRE Channel Arbitrated Loop (FC-AL-2), Dec. 8, 1999, published by American National Standards Institute, Inc., all pages.

U.S. Appl. No. 09/933,866, filed Aug. 20, 2001 for an Operator Initiated Graceful Takeover In A Node Cluster by Samuel M. Cramer et al., all pages.

U.S. Appl. No. 09/933,883, filed Aug. 20, 2001 for a Negotiated Graceful Takeover In A Node Cluster by Samuel M. Cramer et al., all pages.

DAFS: Direct Access File System Protocol, Version 1.00. Sep. 1, 2001, DAFS collaboratiove, all pages.

U.S. Appl. No. 10/027,457, filed Dec. 21, 2001 for a System and Method Of Implementing Disk Ownership In Networked Storage by Susan M. Coatney et al., all pages.

Anupam Bhide, Elmootazbellah N. Elnozahy, Stephen P. Morgan, "A Highly Available Network File Server," Proceedings of the Winter 1991 USENIX Conference, Jan. 21-25, 1991, pp. 1990-205.

* cited by examiner

SYSTEM AND METHOD FOR CLUSTERED FAILOVER WITHOUT NETWORK SUPPORT

RELATED APPLICATIONS

This application is related to the following United States patent applications:

Ser. No. 09/933,883 filed on Aug. 20, 2001 now issued as U.S. Pat. No. 6,920,580 on Jul. 19, 2005 entitled NEGOTIATED GRACEFUL TAKEOVER IN A NODE CLUSTER, by Samuel M. Cramer et al.

Ser. No. 09/933,866 filed on Aug. 20, 2001 now issued as U.S. Pat. No. 6,920,579 on Jul. 19, 2005 entitled OPERATOR INITIATED GRACEFUL TAKEOVER IN A NODE CLUSTER, by Samuel M. Cramer et al.

Ser. No. 09/625,234 filed on Jul. 25, 2000 now issued as U.S. Pat. No. 6,728,897 on Apr. 27, 2004 entitled NEGOTIATING TAKEOVER IN HIGH AVAILABILITY CLUSTER by Samuel M. Cramer, et al.

FIELD OF THE INVENTION

The present invention relates to networks and more particularly to a failover of one server to another server in a cluster of servers in a cluster of servers on a network.

BACKGROUND OF THE INVENTION

A file server is a computer that provides file service relating to the organization of information on storage devices, such as disks. The file server or filer includes a storage operating system that implements a file system to logically organize the information as a hierarchical structure of directories and files on the disks. Each "on-disk" file may be implemented as a set of data structures, e.g., disk blocks, configured to store information. A directory, conversely, may be implemented as a specially formatted file in which information about other files and directories are stored.

A filer may be further configured to operate according to a client/server model of information delivery to thereby allow many clients to access files stored on a server. In this model, the client may comprise an application, such as a database application, executing on a computer that connects to the filer over a computer network. This computer network could be a point to point link, a shared local area network (LAN), a wide area network (WAN) or a virtual private network (VPN) implemented over a public network such as the Internet. Each client may request the services of the file system on the filer by issuing file system protocol messages (typically in the form of packets) to the filer over the network.

The disk storage typically implemented has one or more storage "volumes" comprised of a cluster of physical storage disks, defining an overall logical arrangement of storage space. Currently available filer implementations can serve a large number of discrete volumes (150 or more, for example). Each volume is generally associated with its own file system. The disks within a volume/file system are typically organized as one or more groups of Redundant Array of Independent (or Inexpensive) Disks (RAID). RAID implementations enhance the reliability and integrity of data storage through the redundant writing of data stripes across a given number of physical disks in the RAID group, and the appropriate caching of parity information with respect to the striped data. In the example of a known file system and process, a RAID 4 implementation is advantageously employed. This implementation specifically entails the striping of data across a group of disks, and separate parity caching within a selected disk of the RAID 4 group.

Each filer "owns" the disks that comprise the volumes that the filer services. This ownership means that the filer is responsible for servicing the data contained on the disks. If the disks are connected to a switching network, for example, a Fibre Channel switch, all of the filers connected to the switch are typically able to see, and read from, all of the disks connected to the switching network. However, only the filer that owns the disks can write to the disks. In effect, there is a "hard" partition between disks that are owned by separate filers that prevents a non-owner from writing to a disk.

In one known file system, this ownership information is stored in two locations. Each disk has a predetermined sector arbitrarily named sector S that contains the definitive ownership information. In one example, sector S is sector zero of the disk. The second source of this ownership information is through the use of Small Computer System Interface (SCSI) level 3 reservations. These SCSI-3 reservations are described in SCSI Primary Commands-3, by Committee T10 of the National Committee for Information Technology Standards, which is incorporated fully herein by reference. One technique for implementing disk ownership is described in commonly owned U.S. patent application, Ser. No. 10/027,457, filed on Dec. 21, 2001 entitled SYSTEM AND METHOD OF IMPLEMENTING DISK OWNERSHIP IN NETWORKED STORAGE by Susan M. Coatney, et al., which is hereby incorporated by reference.

The combination of sector S and SCSI-3 reservation ownership information is often represented by the following format <SECTORS, SCSI>, where SECTORS denotes the ownership information stored in sector S and SCSI is the current holder of the SCSI-3 reservation on that disk. Thus, as an example, if sector S and the SCSI-3 reservation of a disk both show that the disk is owned by a filer, arbitrarily termed "Green," that disks' ownership information could be denoted <G,G>, where "G" denotes green. If one of the ownership attributes shows that the disk is unowned, a U is (arbitrarily) used, i.e. <G,U>for a disk whose SCSI-3 reservations do not show any ownership.

It is advantageous for the services and data provided by storage system to be available for access to the greatest degree possible. Accordingly, some computer storage systems provide a plurality of file servers (or filers) in a cluster, with a property that when a first filer fails, the second filer is available to take over and provide the services and the data otherwise provided by the first filer. When a first filer fails, the second filer in the cluster should assume the task of processing and handling any data access requests normally processed by the first filer. Such cluster configurations are described in U.S. patent application Ser. No. 09/625,234 filed on Jul. 25, 2000 now issued as U.S. Pat. No. 6,728,897 on Apr. 27, 2004 entitled NEGOTIATING TAKEOVER IN HIGH AVAILABILITY CLUSTER by Samuel M. Cramer, et al.

In certain known file server cluster implementations, the transport medium is Ethernet cabling utilizing Transport Control Protocol/Internet Protocol (TCP/IP) for transport of data. Various file service protocols can execute on top of the TCP/IP protocol. In known failover techniques involving clusters of file servers, network interface controllers (NIC) contain the capabilities to support multiple machine address controller (MAC) addresses. When one of the file servers in a cluster detected a failure of its partner filer, for example, by sensing that the partner filer is no longer emitting a heart beat signal, this surviving filer proceeds to take over the partner's disks. This involves asserting SCSI reservations so that only the surviving filer can access those disks. This surviving filer then executes a failover script, which involves obtaining the IP address of the failed filer and determining each MAC address associated with the failed filer. Each NIC of the surviving filer is then assigned a MAC address that was normally associated with a NIC on the failed filer. Thus, transfers with IP addresses which were mapped to certain MAC addresses of the failed filer, are no longer routed to the failed filer, but instead are directed to the surviving partner filer.

In alternate embodiments of the known implementations, instead of reassigning MAC addresses to the surviving partner, a new mapping from the IP address to a MAC address associated with the surviving partner is transmitted or broadcast over the network using the Address Resolution Protocol (ARP). ARP is further described in *Request For Comments (RFC) 826: Ethernet Resolution Protocol*, published by the Internet Engineering Task Force (IETF), which is incorporated herein by reference.

A noted disadvantage of prior implementations of clustered failovers occurs if the underlying transport media did not support the moving of transport addresses. By "transport address" it is meant any network address associated with a particular filer. In such cases, the routing techniques normally utilized to achieve the failover would not function. For example, the Fibre Channel transport media does not support moving transport addresses. Fibre Channel is a set of specifications defining a transport media for high-speed efficient networks. The specifications for Fibre Channel are developed by Committee T11 of the International Committee for Information Technology Standards. Fibre Channel does not generally permit unsolicited packets to be broadcast, for example an ARP broadcast with updated routing information. Unsolicited packets may be sent over Fibre Channel, but the sending of unsolicited packets is often destructive in that the unsolicited packet breaks all open connections.

Additionally, virtual interface (VI) connections do not permit the use of unsolicited packets or the reassignment of transport addresses. Virtual interface is a standard for an architecture between high performance network hardware and computer systems. The VI architecture is defined in *Virtual Interface Architecture Specification, Version* 1.0, published by a collaboration between Compaq Computer Corp., Intel Corp., and Microsoft Corp., which is hereby incorporated by reference.

The inability to failover to a cluster partner, if the underlying media does not support moving the transport address, is especially relevant when utilizing certain file systems that rely on such transport mechanisms, including, e.g., the Direct Access File System (DAFS). When using these file systems that utilize transport mechanism which do not support moving transport address or similar routing techniques, known failover procedures will not function. DAFS is a file system protocol which is defined in *DAFS: Direct Access File System Protocol, Version* 1.0 published by the DAFS Collaborative, which is hereby incorporated by reference. DAFS traditionally runs over a non-TCP/IP transport protocol such as a virtual interface (VI) or the InfiniBand Trade Association's InfiniBand™ connection utilizing Fibre Channel as a transport media. Thus, known failover techniques typically would not function in a DAFS environment.

Thus, traditional clustered failover techniques will not function in networking environments that utilize transport protocols that do not support moving transport addresses among network nodes.

SUMMARY OF THE INVENTION

This invention overcomes the disadvantages of the prior art by providing a system and method for clustered failover using virtual interface or other transport media that does not support moving transport addresses. Specifically, the invention provides a system and method for permitting a clustered failover to occur in the direct access file system (DAFS), thereby improving data availability to clients in the event of a file server malfunction. In accordance with the invention, the file servers comprising the cluster are interconnected by a cluster interconnect device, which permits each file server in the cluster to communicate with the others. Upon detecting a failure of one of the file servers in the cluster, the failover file server takes ownership of the disks that were owned by the failed file server. The failover file server then activates an additional data access port, thereby allowing the failover file server to accept input/output requests from clients who were accessing the failed file server. The additional, or secondary, data access port is associated with those clients who were accessing the failed file server.

A novel naming convention for the determination of the name of the failover file server is provided. In one embodiment, the name of the failover file server is generated by appending "-failover" to the name of the file server that is failing. A client can thus generate the name of the failover file server without the need for communicating with the failed file server. Using known network name resolution protocols, a client can resolve this failover file server name to an appropriate network address. Additionally, when a client generates this appropriate failover file server name, it accesses the failover file server using the name of the secondary discriminator.

Thus, when a file server fails, the failover file server takes ownership of the disks owned by the failed file server, activates a new data access port for use by the failed file server clients and begins processing I/O requests directed to the new data access port. Clients of the failed file server compute the name of the failover file server by the use of is a novel naming convention, resolve the name into a network address and access the failover file server using a set alternate data access port name.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Network Environment

Figure 1:
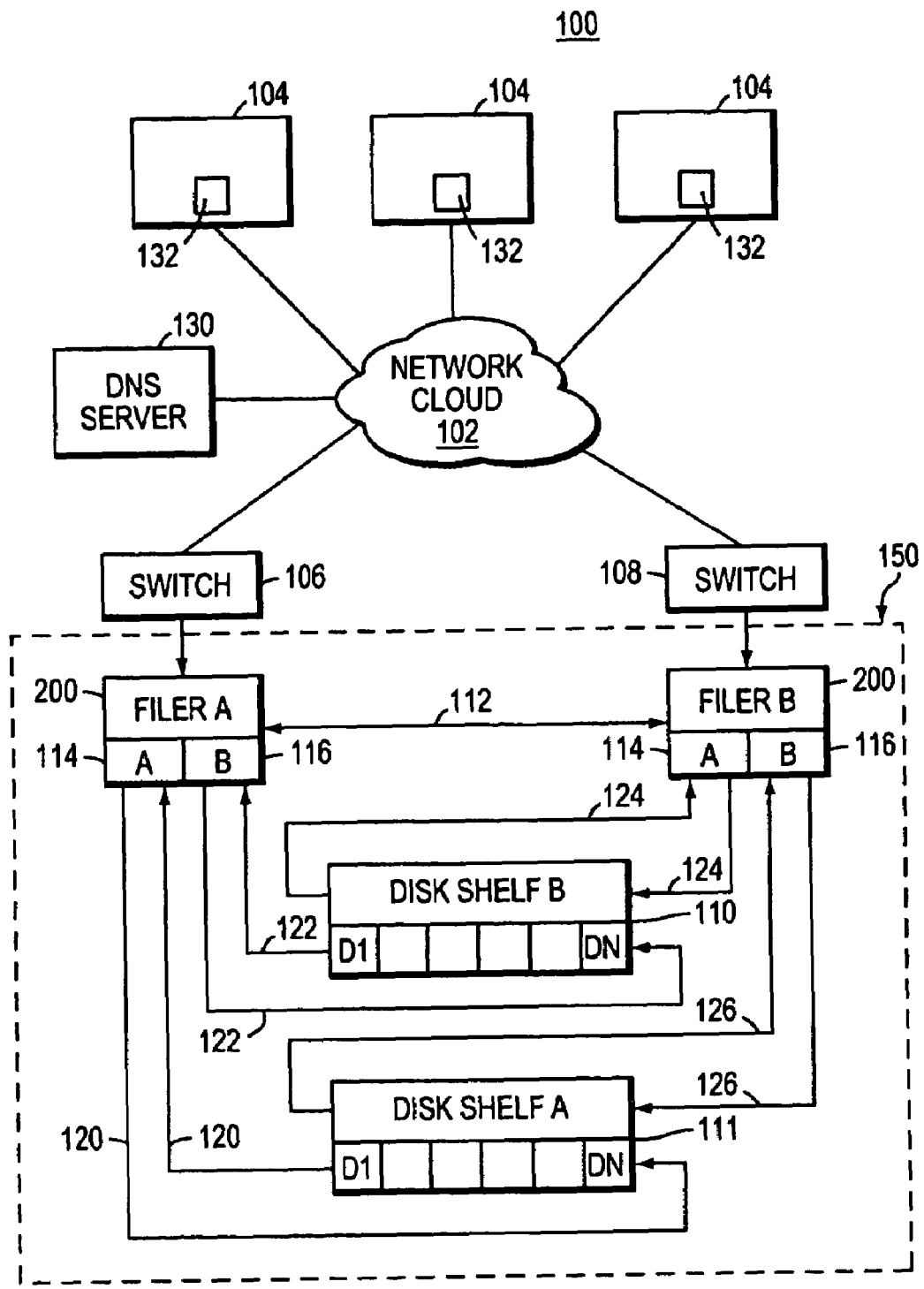
FIG. 1 is a schematic block diagram of two file servers connected in a cluster configuration.

FIG. 1 is a schematic block diagram of an exemplary network environment 100 in which the principles of the present invention are implemented. The network 100 is based around a network cloud 102. Attached to the network cloud are a number of switches 106 and 108 which connect to Filer A and Filer B 200. A number of clients 104 are also interconnected with the network cloud. Clients 104 include, inter alia, file system processes 132. These file system processes 132 handle data access requests from other processes (not shown) of the clients. File system processes format appropriate data access requests before transmission to a filer and receive and process data from the filer before passing the data to other processes. In addition, file system processes perform the novel failover name computation described further below. The network cloud 102 can be any appropriate switching fabric including, e.g. a Fibre Channel fabric. Fibre Channel is a set of related standards defining a transport service for a variety of data access protocols. The Fibre Channel definition is contained within various specification documents, including *NCI TS* 332-1999 *Fibre Channel Arbitrated Loop* (*FC-AL*-2) published by the American National Standards Institute which is hereby incorporated by reference. For purposes of this description, the term network cloud should be taken broadly to include any acceptable networking architecture.

Also attached to the network cloud 102 is a domain name system (DNS) server 130. The DNS server 130 provides name resolution services to other network devices in accordance with an appropriate name resolution protocol.

A client 104 may be a general-purpose computer, such as a PC or a workstation, or a special-purpose computer, such as an application server, configured to execute applications over an operating system that includes file system protocols.

Filer A and Filer B (200) are connected as two nodes as a file server cluster 150. These filers, described further below, are file servers configured to control storage of and access to, interconnected storage volumes. As described further below, each volume is typically organized to include one or more RAID groups of physical storage disks for increased data storage integrity and reliability. Each of the devices attached to the network cloud 102 or switches 106 and 108 includes an appropriate conventional network interface arrangement (not shown) for communicating over the network cloud 102, or through the switches 106 and 108, using a set of desired communication protocols such as the virtual interface (VI) architecture.

In the illustrated example, Filer A is connected to disk shelf A via fibre channel loop 120. Similarly, Filer A accesses disk shelf B 110 through a counterpart fibre channel loop 122. Likewise Filer B access disk shelf B 110 through fibre channel loop 124 and disk shelf A 111 through counterpart fibre channel loop 126.

Connecting Filer A and Filer B is a cluster interconnect 112, which provides a direct communication link between the two filers. The cluster interconnect can be any suitable communication medium, including, for example, an Ethernet connection.

B. File Servers

Figure 2:
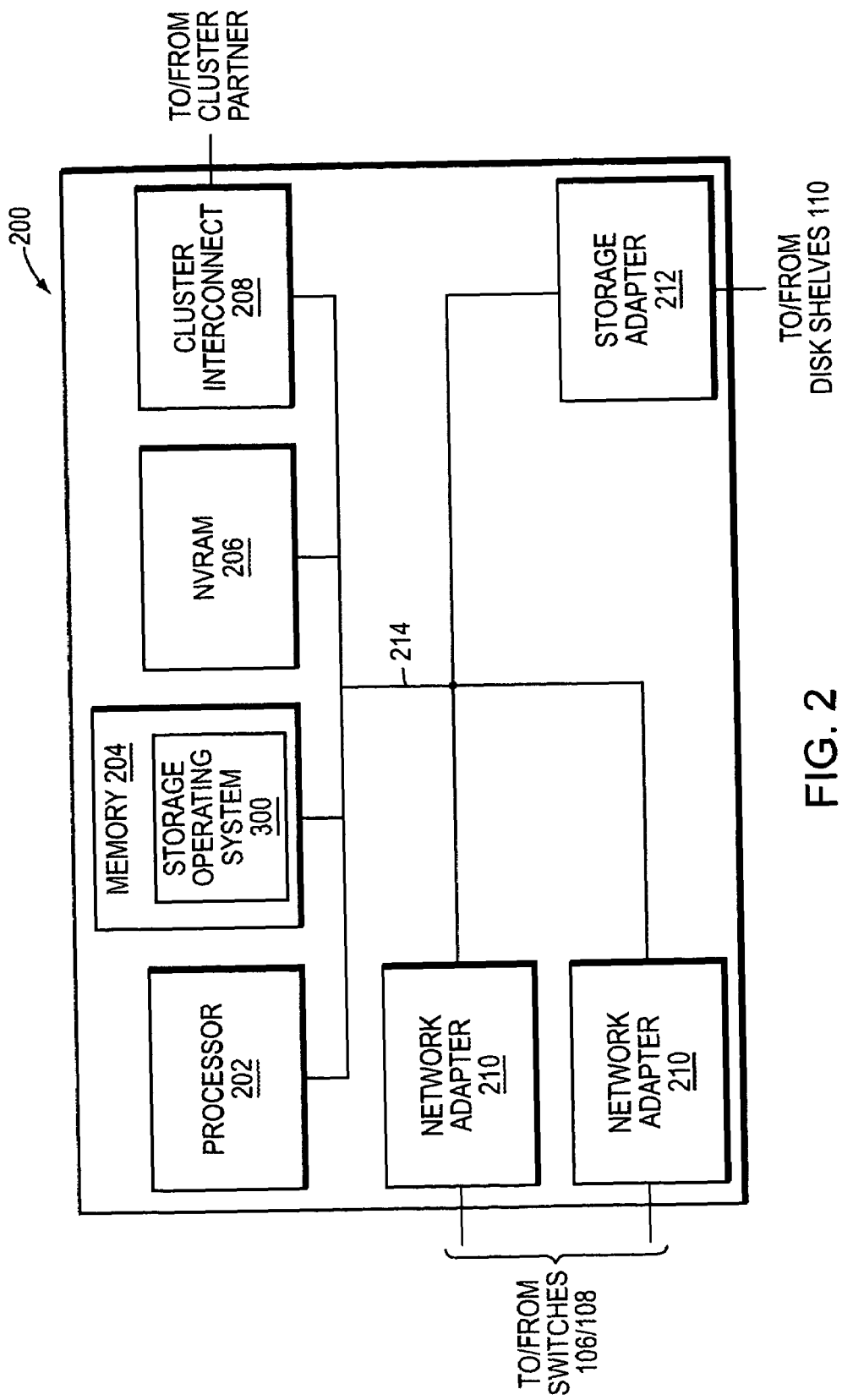
FIG. 2 is a more-detailed schematic block diagram of an exemplary file server in accordance with FIG. 1.

FIG. 2 is a more-detailed schematic block diagram of an exemplary file server 200 that is advantageously used with the present invention. Other file servers can have similar construction. By way of background, a file server, embodied as a filer is a special-purpose computer that provides file services relating to the organization of information on storage devices, such as disks. However, it will be understood by those skilled in the art that the inventive concepts described herein may apply to any type of special-purpose computer or general-purpose computer. The filer comprises a processor 202, a memory 204, one or more network adapters 210, a storage adapter 212, a nonvolatile random access memory (NVRAM) 206 and a cluster interconnect 208 interconnected by system bus 214. The filer also includes, within memory 204, a storage operating system 300 that implements the file system to logically organize the information the hierarchical structure of directories and files on the disks.

In the illustrative embodiment, the memory 204 may have storage locations that are addressable by the processor and adapters for storing software program code and data structures associated with the present invention. The processor and adapters, may, in turn, comprise processing elements and/or logic circuitry configured to execute the software code and manipulate the data structures. The storage operating system 300, portions of which are typically resident in memory and executed by the processing elements, functionally organizes a filer by invoking storage operations in support of a file service implemented by the filer. It will be apparent to those skilled in the art that other processing and memory implementations, including various computer-readable media, may be used for storing and executing program instructions pertaining to the inventive techniques described herein.

The network adapters 210 comprise a mechanical, electrical and signaling circuitry needed to connect the filer to various clients via the network cloud. A client can be a general-purpose computer configured to execute applications including file system protocols, such as the direct access file system (DAFS) protocol. Moreover, the client can interact with the filer in accordance with the client/server model of information delivery. The storage adapters cooperate with the storage operating system 300 executing on the filer to access information requested by the client.

The storage adapter 212 includes input/output (IO) interface circuitry that couples the filer to the disk shelves over an I/O interconnected arrangements such as a conventional high-speed high-performance fibre channel serial link topology. The information is retrieved by the storage adapter, and if necessary, processed by the processor (or the adapter itself) prior to being forwarded over the system bus 214 to the appropriate network adapter 210 where the information is formatted into appropriate packets and returned to the client.

To facilitate access to the disks, the storage operating system 300 implements a file system that logically organizes the information as a hierarchical structure of directories in files on the disks. Each on-disk file may be implemented as a set of disk blocks configured to store information such as text, where as the directory may be implemented as a specially formatted file in which other files and directories are stored. In the illustrative embodiment described herein, the storage operating system associated with each volume is preferably NetApp® Data ONTAP™ operating system available from Network Appliance, Inc. of Sunnyvale, Calif. that implements a Write Anywhere File Layout (WAFL) file system. The preferred storage operating system for the exemplary filer is described further below; however, it is expressly contemplated that the principles of this invention can be implemented using a variety of alternate operating system architectures.

The cluster interconnect 208 provides a communication link to the filer's cluster partner. In the exemplary embodiment, filers in a cluster configuration issue regular "heartbeat" signals over the cluster interconnect to its filer partner. These heartbeat signals alert the cluster partner that a given filer is operational. Similarly, the absence of these heartbeat signals alerts a partner filer that a filer is experiencing an error condition.

C. Storage Operating System

Figure 3:
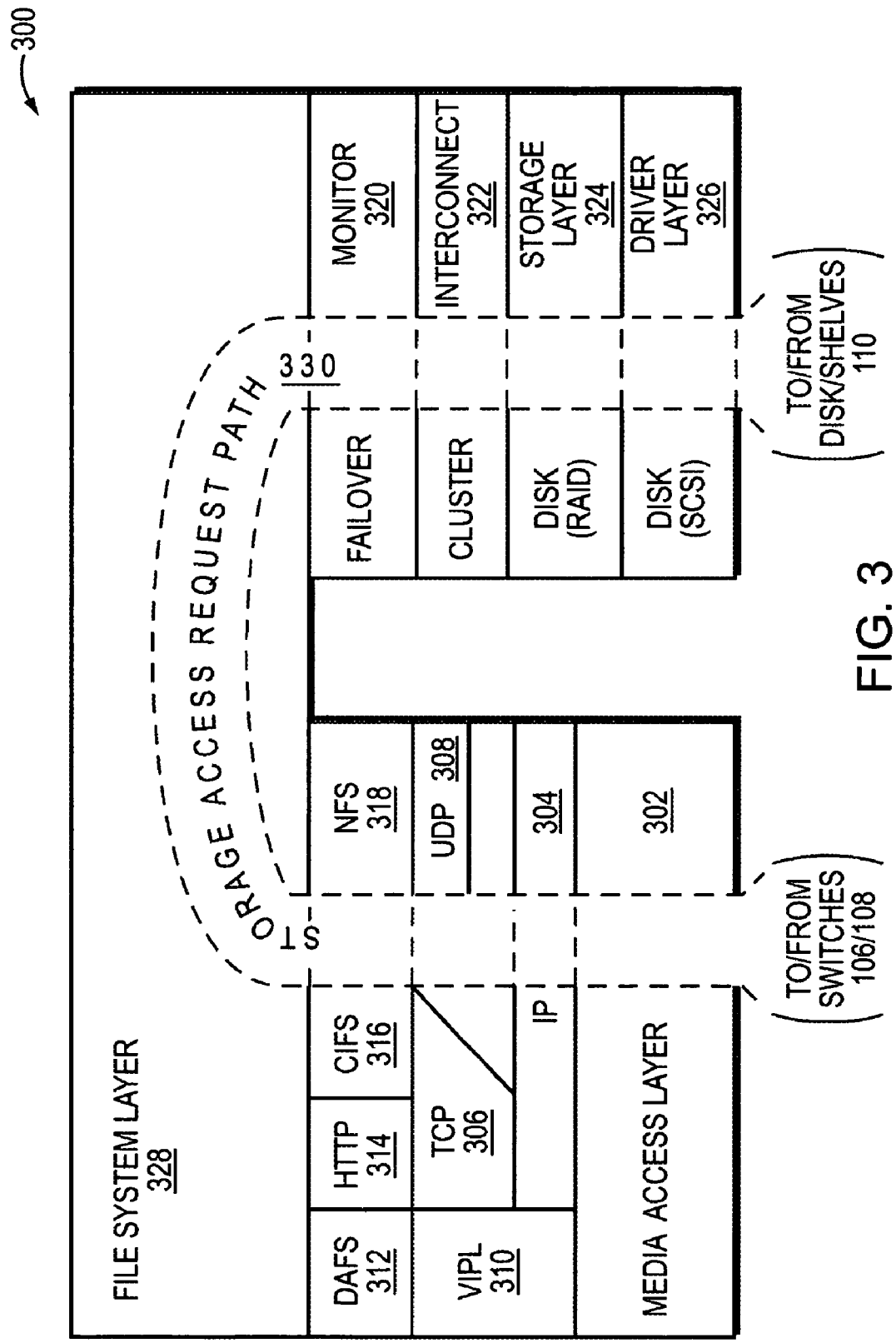
FIG. 3 is a schematic block diagram of an exemplary storage operating system for use with the exemplary file server of FIG. 2 according to an illustrative embodiment of this invention.

As shown in FIG. 3, the storage operating system 300 comprises a series of software layers including a media access layer 302 of network drivers (e.g., ethernet driver). The storage operating system further includes network protocol layers such as the IP layer 304 and its TCP layer 306, and a UDP layer 308. Additionally the storage operating system provides a virtual interface provider library (VIPL) layer 310, which implements the virtual interface architecture. A file system protocol layer provides multi-protocol data access and, to that end, includes support for the Direct Access File System (DAFS) protocol 312, the Hyper Text Transport Protocol (HTTP) 314, the Common Internet File System (CIFS) protocol 316 and the Network File System (NFS) protocol 318.

In addition, the storage operating system 300 includes a disk driver layer 326 that implements a disk access protocol such as e.g., a Small Computer System Interface (SCSI) protocol and a disk storage layer 324 but implements a disk storage protocol such as a RAID protocol. In addition the storage operating system 300 includes a failover monitor layer 320 in a cluster interconnect layer 322. The failover monitor 320 and cluster interconnect layers 322 operate in conjunction the cluster interconnect 208 (see FIG. 2) in transmitting heart beat signals to a cluster partner file server.

Bridging the disk software layers with a network and a file system protocol layers is a file system layer 328 of the storage operating system 300. Generally, the file system layer 328 implements a file system as having an on-disk file format representation that is block-based. The file system generates operations to load/retrieve the requested data of volumes if it is not resident "in-core," i.e., in the filer's memory. If the information is not in memory, the file system layer indexes into the inode file using the inode number to access an appropriate entry and retrieve a logical block number. The file system layer then passes the logical volume block number to the disk storage/RAID layer, which maps out logical numbers to a disk block number and sends the latter to an appropriate driver of a disk driver layer. The disk driver accesses the disk block number from volumes and loads the requested data into memory into processing by the filer. Upon completion of a request, the filer and operating system return their reply. It should be noted that the software "path" 330 through the storage operating system layers described above, needed to perform data storage access for the client, may ultimately be implemented in hardware, software or a combination of hardware and software.

D. Cluster Failover Operation

For a client to successfully access a failover filer in the event of a failure or error condition of a client's primary filer, the client should have either a network address or a resolvable name of the failover filer. As used herein, a resolvable name is a symbolic name that can be translated into an appropriate network address using an appropriate name resolution service such as, for example, the Domain Naming System (DNS). For the purposes of this description the term "failover filer" means the filer or file server that is assuming the duties of a failed file server.

In accordance with an embodiment of this invention, a naming convention is used for the computation of the resolvable name of the failover filer. Each file server in a clustered failover pair is associated with two resolvable names. The first resolvable name shall be the regular hostname of that particular filer. The second name shall be a decorated name relative to the partner's hostname. This decoration shall be the text "-failover" appended to the partner hostname.

Similarly, in accordance with one embodiment of this invention, each file server utilizes a pair of predetermined names for virtual interface discriminators. In accordance with an embodiment of this invention, the primary file server being accessed uses a default discriminator named "DAFS." A discriminator is a VI data access port, similar to a port used in traditional TCP/IP communications. If the failover location is being accessed, the discriminator "pDAF" should be utilized. This alternate discriminator pDAF, which stands for "partner DAFS", permits the failover filer to only accept requests directed to its partner when it is in an active failover mode. It should be noted that while this description written in terms of VI and discriminators, the principles of the present invention are applicable to any networking architecture that provides support for multiple data access ports to a given network device. As such, the terms "VI" or "virtual interface" should be taken to mean any acceptable networking interface. Similarly, the term "discriminator" should be understood to refer to the appropriate type of data access port associated with the networking protocols utilized.

Table 1 shows an illustrative arrangement of names and discriminators for use in an exemplary networking environment. If the primary filer's resolvable name is FilerA, the resolvable name of the failover filer to be accessed in the event that FilerA suffers an error is called "FilerA-failover." Similarly, a client should utilize a discriminator termed DAFS when accessing Filer A. When accessing Filer A-failover, clients should use the discriminator termed pDAF.

TABLE 1

|  | Name | Discriminator |
|---|---|---|
| Primary Filer | FilerA | DAFS |
| Failover Filer | FilerA-failover | pDAF |

The resolvable name of the failover filer is resolved into the network address of the failover filer by the client. This resolution from a resolvable name to a network address is accomplished using known name resolution techniques. For example, in the network environment shown in FIG. 1, the resolvable name "FilerA-failover" would be resolved to the appropriate network address of Filer B, which is Filer A's clustered failover partner. Similarly, the name "FilerB-failover" would be resolved, using the appropriate name resolution service, to the network address of FilerA. Thus, a client can, by appending the set of string "-failover" to a known file server's name, generate the resolvable name of the failover filer that is a cluster partner. From this computed resolvable name, the client can then generate the proper network address of the failover filer.

It should be noted that alternate naming mechanisms can be utilized in accordance with the teachings of this invention. For example, other suffixes can be added to the name of a particular file server to determine the name of its failover partner. Similarly, a prefix can be added to the beginning of the name of a particular filer instead of appended to the end. Additionally, it should be noted that other discriminator or other data access port names can be utilized in accordance with the teachings of this invention. It is expressly contemplated that data access ports other than VI discriminators can be used with the teachings of this invention. In such alternate embodiments, the data access port utilized could be given a preset and predetermined name for the appropriate secondary data access port that is suitable for the transport protocol utilized, for example, InfiniBand™. The particular examples used in this description are for illustrative purposes only and are not meant to limit the scope of the invention.

Figure 4:
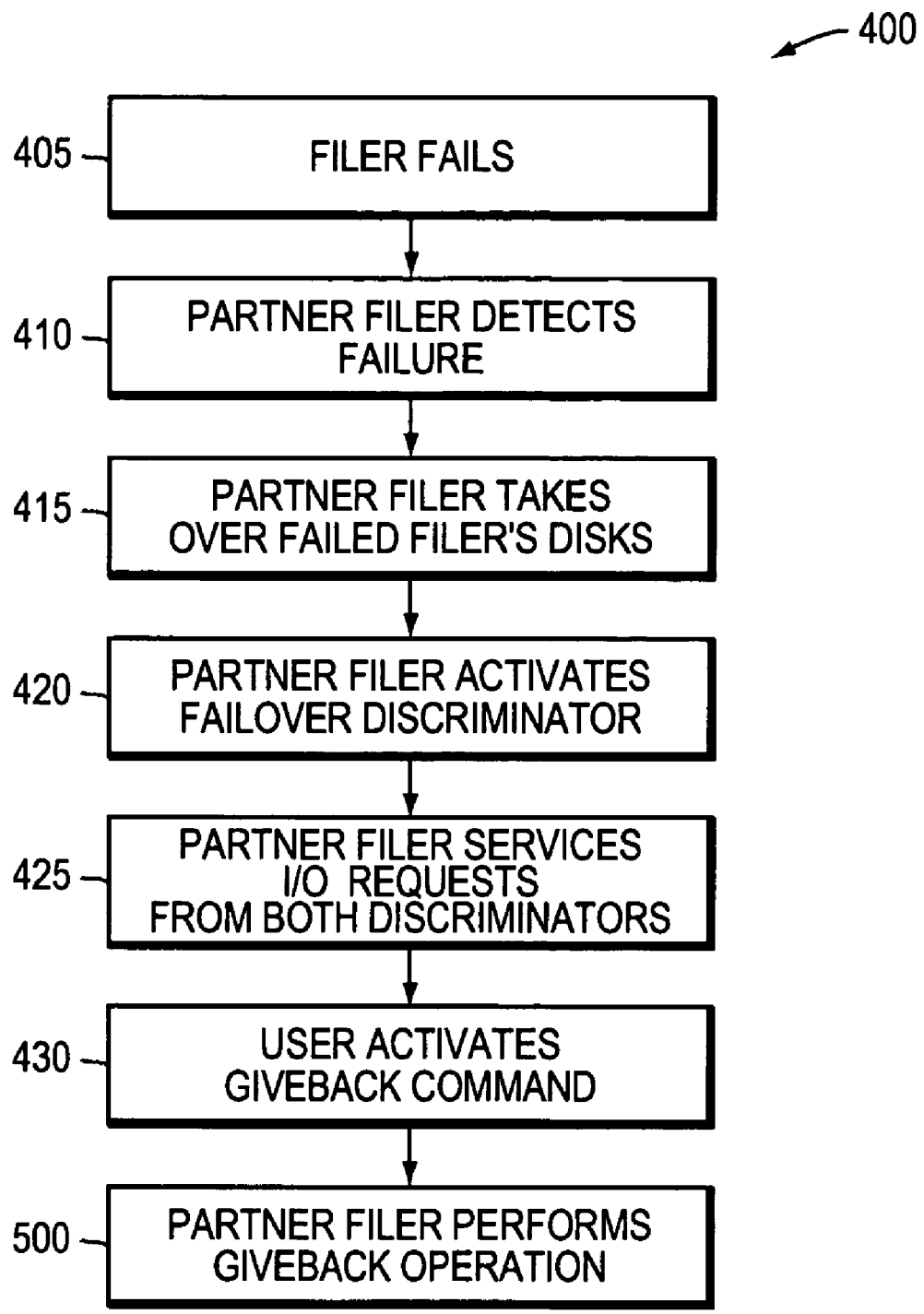
FIG. 4 is a flow chart of a procedure that a partner file server performs in accordance with an embodiment of this invention.

FIG. 4 shows the steps 400 of a procedure performed by the failover filer in accordance with this invention. In step 405, one of the filers in a clustered pair fails. This failure can be either due to a software and/or hardware problem, or due to a power failure and the like. In step 410, the failover filer detects the failure of its partner filer. This detection can occur by the failover filer detecting a lack of a heartbeat signal from the failed filer, or by other means, including an "I am failing" message transmitted by the failing filer over the cluster interconnect. The failover filer then takes over the failed filers disks, in step 415. This takeover of the failed filer's disks can be accomplished using known techniques to assert disk ownership in a network storage environment. One example is the method described in the above-incorporated patent application entitled SYSTEM AND METHOD OF IMPLEMENTING DISK OWNERSHIP IN NETWORKED STORAGE.

Then, in step 420, the failover filer activates the failover discriminator. In the illustrative embodiment, this failover discriminator is called pDAF. Once this failover discriminator has been activated, the failover filer will accept connection requests and connections directed to this failover discriminator. At this point, after clients have detected the failure of the filer and have computed the failover address and connected to the failover filer (as shown FIG. 6), the failover filer then services the I/O requests from both discriminators, i.e. DAFS and pDAF (step 425). At this point, the failover is complete and the partner filer is servicing data access requests and performing that were initially directed to file service operation the failed filer. This failover status exists until, according to step 430, a user activates a give back command on the partner filer. Upon execution of the give back command, in step 500, the partner filer performs a give back operation, described further below. After the give back operation, the failover filer resumes normal operation of only servicing data access requests directed to volumes normally owned by the filer.

Figure 5:
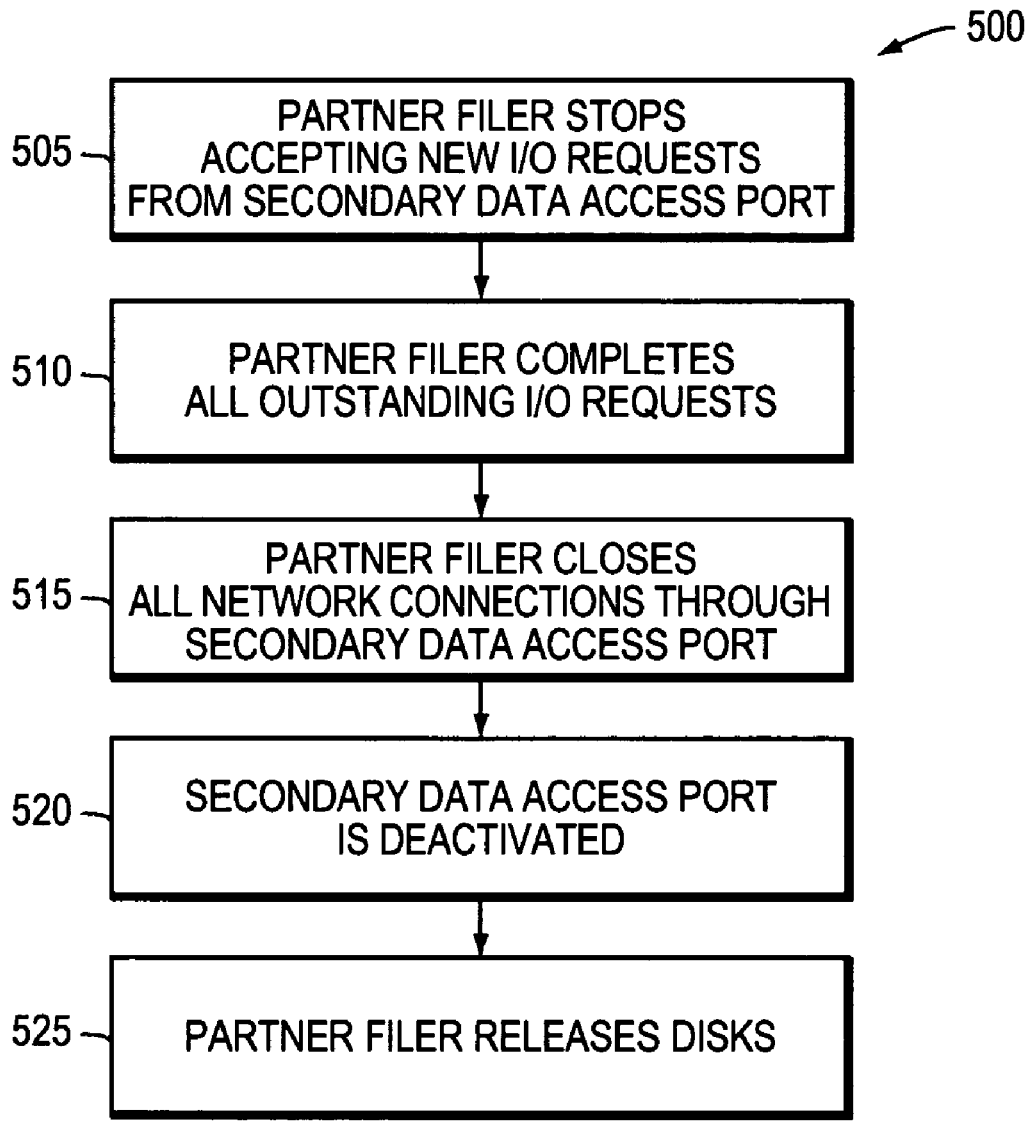
FIG. 5 is a flow chart of a procedure that a partner filer performs during a give back operation in accordance with FIG. 4.

FIG. 5 is a flow chart of the steps involved in the procedure 500 of the giveback operation performed by a partner filer after the user or administrator initiates the giveback operation. In step 505, the partner filer stops accepting new input/output operation requests from the secondary data access port. The partner filer then completes all outstanding I/O requests in step 510. As part of this completion of outstanding I/O requests, the partner filer, in the illustrative embodiment, forces a consistency point, described further below, which causes any data stored in any of the partner filer's buffers or in its NVRAM to be flushed to physical disks.

In the illustrative embodiment, as a file service request is processed by the WAFL file system, an entry for that request is written into the NVRAM as a journal entry. The journal entry may comprise, for example, "Create file", "Write file Data", "Open file", etc. Widely accepted file system standards, such as NFS, specify that a file server should not reply to a requesting client until a given request is written out to stable storage. By writing to NVRAM this requirement is met and a reply can be returned to the requesting client with respect to the service request before the results of the request have been written to a hard disk.

The NVRAM is temporarily loaded with service requests until such time as a consistency point (CP) is reached. CPs may occur at fixed time intervals, or when other key events arise, such as the NVRAM log section being filled. In the illustrative embodiment, a CP is forced after all partner filer I/O operations have been completed. Thus, all I/O operations will be written to disk before the giveback procedure continues. At such times, the accumulated contents of the log 0 or log 1 are "flushed" (written) to hard disk, thereby completing the CP.

Next, in step 515, the partner filer closes all network connections through the secondary data access port. Then, in step 520, the secondary data access port is deactivated. Finally, the partner filer, in step 525, releases the disks to be owned by the revived filer. This release of the disks is accomplished by moving the disks from a partner filer owned state to an unowned state. One method of moving these disks to an unowned state is defined and described in the above-incorporated patent application.

Figure 6:
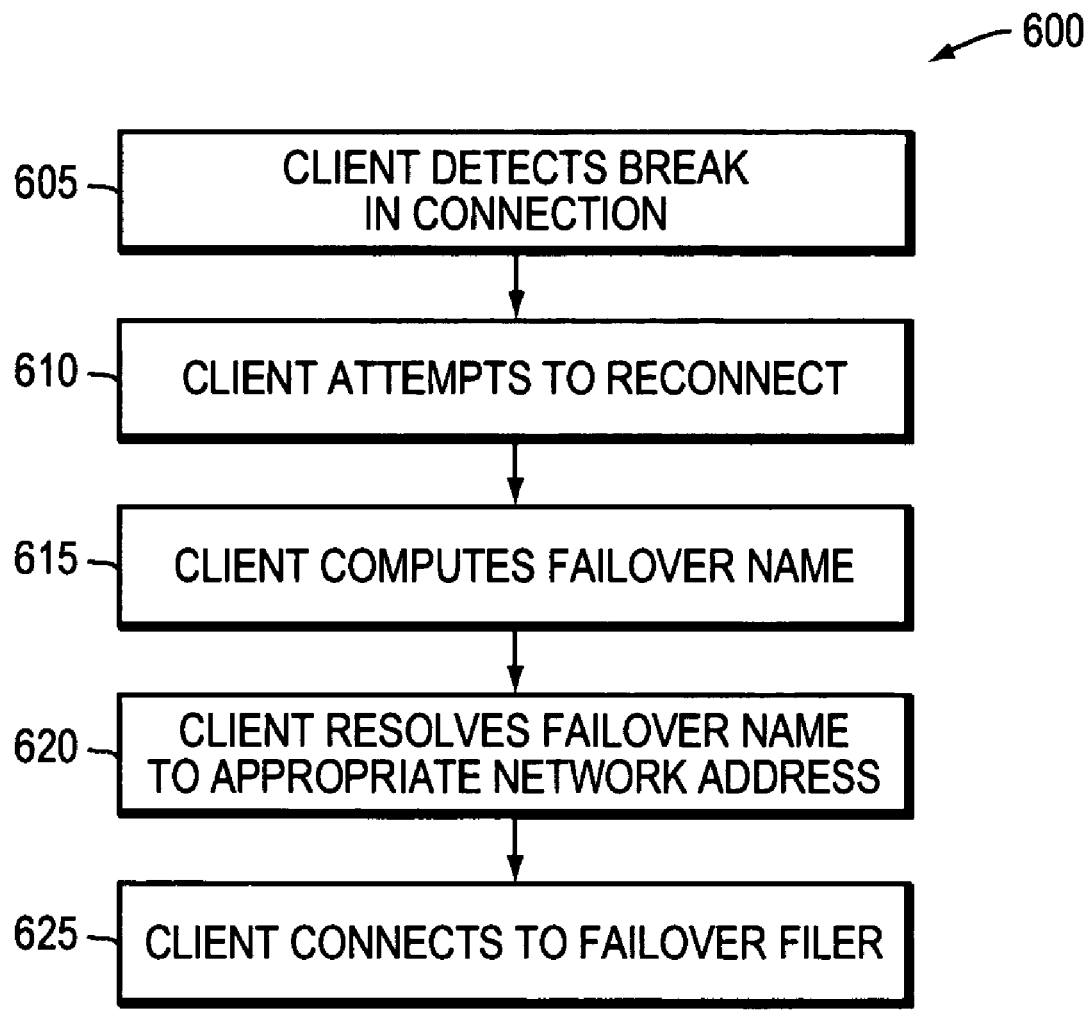
FIG. 6 is a flow chart detailing a procedure performed by the client in computing a failover address and connecting to a failover partner in accordance with an illustrative embodiment of this invention.

FIG. 6 is a flow chart detailing the steps of the procedure performed by a client in a clustered failover situation in accordance with an embodiment of this invention. In step 605, the client detects a break in its connection with the file server. Next, in step 610, the client attempts to reconnect to that file server by opening a new virtual interface connection. If that reconnection attempt is not successful, the client computes the proper failover name in step 615. This failover name is calculated using the above-mentioned naming methodology to produce a resolvable name of the failover filer. Next, in step 620, the client utilizes a name resolution service to resolve the resolvable failover name into an appropriate network address. The client then connects to the failover filer using the proper network address and discriminator name (step 625).

Thus, in the illustrative embodiment, the surviving filer of a cluster does not utilize any routing tricks or methodologies to direct clients to access it. Instead, clients are programmed, upon detection of a failure or other error condition in a file server, to compute a failover address of a clustered partner. The client then accesses this clustered partner using a secondary discriminator and the failover address that the client has computed. This prevents a noted disadvantage in the prior art of experiencing a failure of a file server before it communicates a failover location to clients.

Once the failover address is computed, by, for example, in this illustrative embodiment appending "-failover" to the name of the file server, the client utilizes traditional name resolution service techniques. These name resolution service techniques, for example the domain naming service (DNS) (130 in FIG. 1), will translate the symbolic failover address, e.g., FilerA-failover, to an appropriate network address. Thus, once a client detects that a file server has failed, or has become unresponsive, the client can compute a failover address of the failover file server. Then, by utilizing known name resolution techniques, the client can obtain the network address of the failover file server. The client then connects to this failover file server using a defined secondary discriminator name.

By enabling clients to compute the symbolic name of the failover filer, clustered file servers can operate using transport protocols that do not support moving transport address from computer to computer. Specifically, clients and file servers utilizing DAFS over a VI connection can not move transport address among file servers to achieve failover. By enabling the client to determine the address of the failover filer, using the naming methodology taught herein, file servers using DAFS and VI or similar transport protocols can achieve failover. This failover helps prevent downtime, where clients cannot access data stored on disks served by a filer.

In an alternative embodiment a unique discriminator, or data access port, may be assigned to a volume. When a file server managing data contained on that volume suffers an error condition, clients can utilize the principles of the present invention to calculate a failover location to access the data. In an environment where volumes are associated with a discriminator (data access port), a plurality of failover locations may be present. Thus, the client could select from a plurality of potential network addresses to connect to a particular volume.

E. Operator-Initiated Failover

Figure 7:
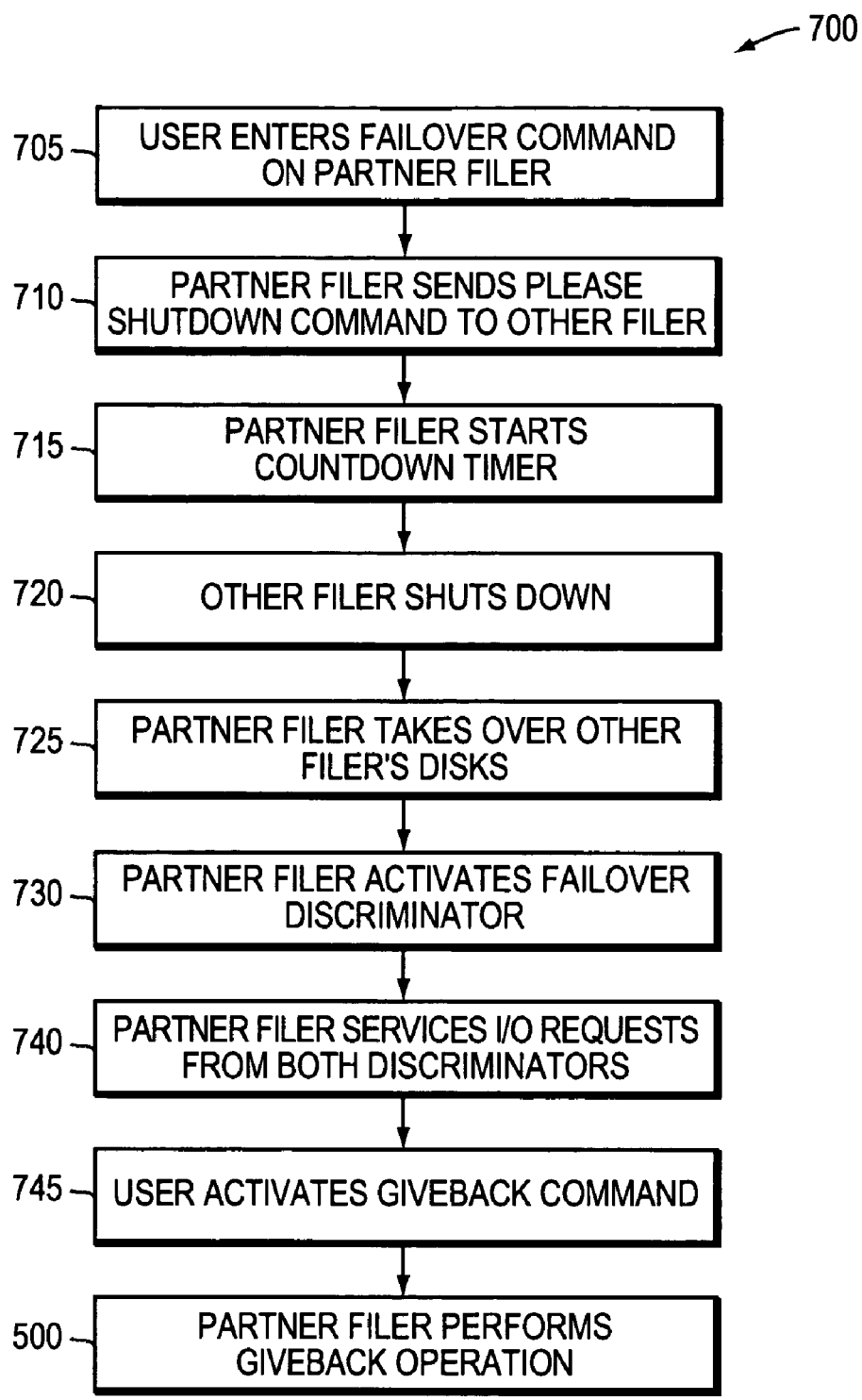
FIG. 7 is a flow chart of a user initiated failover process.

In certain instances, it is useful for a partner file server to take over the operations of another file server even though the other file server has not suffered an error condition. Such a user-initiated failover can be utilized when, for example, a repair or upgrade to the other file server needs to occur. These user initiated failovers are described generally in U.S. patent application Ser. No. 09/933,883 filed on Aug. 20, 2001 now issued as U.S. Pat. No. 6,920,580 on Aug. 20, 2001 entitled NEGOTIATED GRACEFUL TAKEOVER IN A NODE CLUSTER, by Samuel M. Cramer et al. and in U.S. patent application Ser. No. 09/933,866 filed on Aug. 20, 2001 now issued as U.S. Pat. No. 6,920,579 on Jul. 19, 2005 entitled OPERATOR INITIATED GRACEFUL TAKEOVER IN A NODE CLUSTER, by Samuel M. Cramer et al. By utilizing the principles of the present invention, no interruption in file services will occur to clients of the file server to be taken offline. The process 700 performed in such a user-initiated failover is shown in FIG. 7. In step 705, the user or administrator enters a failover command on the partner filer. Such a failover command would typically be included in the command set of the storage operating system associated with the file server. In response to the failover command, the partner filer sends, in step 710, a "Please Shutdown" command to the other filer. Such a "Please Shutdown" command can be sent via the cluster interconnect. Next, in step 715, the partner filer starts a countdown timer. This countdown timer sets a time period for the partner filer to wait before attempting to take control and ownership of the other filers disks. The other filer precedes to shutdown (step 720) in response to the "Please Shutdown" command sent by the partner filer. At the expiration the countdown timer, the partner filer takes over the other filers disks in step 725. This taking over of ownership of disks is described in detail above. Next, in step 730, the partner filer activates its failover discriminator. After this failover discriminator has been activated, the partner filer can then service I/O requests from both its primary and secondary discriminators (step 740). The partner file server continues to service these I/O requests until such time that the user activates a giveback command in step 745. Upon initiation of the giveback command, the partner filer then performs a giveback operation (step 500).

The foregoing has been a detailed description of illustrative embodiments of the invention. Various modifications and additions can be made without departing from the spirit and scope of the invention. For example, a variety of naming techniques to determine the name of the failover file server can be utilized according to this invention. Likewise, the names of the primary and secondary discriminators utilized by the file servers in accordance with this invention can be varied. It should also be noted that alternate forms of data access ports, other than VI discriminators, can be utilized in accordance with the teachings of this invention. While this description has been written with reference to the DAFS file system and VI connections, it should be noted that any suitable file system and appropriate transport protocol can be used in accordance with the teachings of this invention. It is expressly contemplated that any of the functions, procedures or processes described herein can be implemented using hardware, firmware or software, consisting of a computer-readable medium including program instructions executing on a computer, or a combination of hardware, firmware and/or software. Accordingly, this description is meant to be taken only by way of example and not to otherwise limit the scope of the invention.

What is claimed is:

1. A method for a first file server to provide file service operations normally performed by a second file server after the second file server suffers an error condition, the first and second file servers operatively interconnected with a set of clients using a network protocol, the network protocol being free of support for moving a transport address from the second file server to the first file server, the method comprising the steps of:

detecting, by the first file server, that the second file server has suffered an error condition;

asserting ownership, by the first file server, of a set of storage devices normally owned by the second file server;

activating, on the first file server, a secondary data access port for receiving connections over a network; and processing, by the first file server, file service operations directed to the secondary data access port from a set of failover clients, the failover clients accessing the first file server by computing a network address associated with the first file server from a first symbolic name, the first symbolic name generated by the failover client from a second symbolic name associated with the second file server, whereby failover operation is achieved by the client.

2. The method of claim 1 wherein the step of detecting the error condition further comprises the steps of sending, by the second file server, an error message to the first file server.

3. The method of claim 1 wherein the step of detecting an error condition further comprises the step of:

detecting, by the first file server, a lack of a status signal generated by the second file server.

4. The method of claim 1 wherein the secondary data access port is a virtual interface discriminator.

5. A method for a client to continue to access file service operations after a first file server has suffered an error condition, the method comprising the steps of:

computing a failover name by appending a set text string to a name of the first file server;

resolving the failover name to a network address;

connecting to a failover file server using the network address and a predetermined alternate data access port.

6. The method of claim 5 wherein the predetermined alternate data access port further comprises a virtual interface discriminator.

7. A computer-readable medium, including program instructions executing on a client, for the client to continue to access file service operations after a first file server has suffered an error condition, the instructions including steps for:
   computing a failover name by appending a set text string to a name of the first file server;
   resolving the failover name to a network address; and
   connecting to a failover file server using the network address and a predetermined alternate data access port.

8. A method for operating a computer failover system, comprising:
   executing a client computer program on a client computer, the client computer program communicating with a first file server, the first file server associated with a file server name;
   computing from the file server name, by a file system process on the client computer, a failover name associated with a failover file server;
   resolving the failover name to a network address;
   detecting an error condition; and
   connecting, in response to detecting the error condition, to a failover file server port having the network address.

9. The method as in claim 8, further comprising:
   computing the failover name by modifying the file server name by an alphanumeric text.

10. The method as in claim 8, further comprising:
    computing the failover name by appending the text "backup" to the file server name used to communicate with the first file server.

11. The method as in claim 8, further comprising:
    transmitting the failover name to a distributed naming service to perform the step of resolving the failover name to a network address.

12. The method as in claim 8, further comprising:
    using a database program as the client computer program.

13. The method as in claim 8, wherein the step of detecting the error condition further comprises:
    detecting a lack of a heartbeat signal from a failed file server.

14. The method as in claim 8, wherein the step of detecting the error condition further comprises:
    transmitting by a failing file server an "I am failing" message.

15. A computer failover system, comprising:
    means for executing a client computer program on a client computer, the client computer program communicating with a first file server, the first file server associated with a file server name;
    means for computing from the file server name, by a file system process on the client computer, a failover name associated with a failover file server;
    means for resolving the failover name to a network address;
    means for detecting an error condition; and
    means for connecting, in response to detecting the error condition, to a failover file server port having the network address.

16. The system as in claim 15, further comprising:
    means for computing the failover name by modifying the file server name by an alphanumeric text.

17. The system as in claim 15, further comprising:
    means for computing the failover name by appending the text "backup" to the file server name used to communicate with the first file server.

18. The system as in claim 15, further comprising:
    means for transmitting the failover name to a distributed naming service to perform the step of resolving the failover name to a network address.

19. The system as in claim 15, further comprising:
    means for using a database program as the client computer program.

20. The system as in claim 15, further comprising:
    means for detecting a lack of a heartbeat signal from a failed file server.

21. The system as in claim 15, further comprising:
    means for sending, by a failing file server, an error message to the first file server.

22. The system as in claim 15, further comprising:
    means for transmitting by the failing file server an "I am failing" message.

23. A computer failover system, comprising:
    a client computer having a client computer program executing thereon, the client computer program communicating with a first file server, the first file server associated with a file server name;
    a file system process on the client computer, the file system process computing from the file server name a failover name associated with a failover file server;
    a port to transmit the failover name to a distributed name server to resolve the failover name to a network address;
    a port to receive a message reporting an error condition in the first file server; and
    a file system process to use the failover name and network address to connect, in response to the error condition, to a failover file server port having the network address.

24. The system as in claim 23, further comprising:
    a file system process to compute the failover name by modifying the file server name by an alphanumeric text.

25. The system as in claim 23, further comprising:
    a file system process to compute the failover name by appending the text "backup" to the file server name used to communicate with the first file server.

26. The system as in claim 23, further comprising:
    a file system process to transmit the failover name to a distributed naming service to perform the step of resolving the failover name to a network address.

27. The system as in claim 23, further comprising:
    the client computer program is a database program.

28. The system as in claim 23, further comprising:
    means for detecting a lack of a heartbeat signal from a failed file server.

29. The system as in claim 23, further comprising:
    means for sending, by a failing file server, an error message to the first file server.

30. The system as in claim 23, further comprising:
    means for transmitting by the failing file server an "I am failing" message.

31. A computer readable media, comprising:
    said computer readable media containing instructions for execution on a processor for the practice of a method for operating a computer failover system, the method having the steps of,
    executing a client computer program on a client computer, the client computer program communicating with a first file server, the first file server associated with a file server name;
    computing from the file server name, by a file system process on the client computer, a failover name associated with a failover file server;

resolving the failover name to a network address;
detecting an error condition; and
connecting, in response to detecting the error condition, to a failover file server port having the network address.

32. A client interconnected to a first file server and to a second file server, the client comprising:
means for detecting the first file server has suffered an error condition;
means for computing a failover name by appending a set text string to a name of the first file server;
means for resolving the failover name to a network address;
means connecting to a failover file server using the network address and a predetermined alternate data access port.

33. The client of claim 32 wherein the predetermined alternate data access port further comprises a virtual interface discriminator.

34. A method for a first file server to provide file service operations normally performed by a second file server after the second file server suffers an error condition, the method comprising:
detecting, by the first file server, that the second file server has suffered an error condition; and
processing, by the first file server, file service operations from a set of failover clients, the failover clients accessing the first file server by computing a network address associated with the first file server from a first symbolic name, the first symbolic name generated by appending a set text string to a second symbolic name of the second file server.

35. The method of claim 34 further comprising:
activating, on the first file server, a secondary data access port for receiving connections over a network; and
servicing file service operations from the set of failover clients using the secondary data access port.

36. The method of claim 34 further comprising:
asserting ownership, by the first file server, of a set of storage devices normally owned by the second file server.

37. The method of claim 34 further comprising:
transmitting the first symbolic name to a distributed naming service to compute the network address.

38. The method as in claim 34, wherein the step of detecting further comprises:
detecting a lack of a heartbeat signal from the second file server.

39. The method as in claim 34, wherein the step of detecting further comprises:
transmitting by the second file server a message indicating that failover should begin.

40. A computer failover system allowing a first file server to provide file service operations normally performed by a second file server after the second file server suffers an error condition, the system comprising:
means for detecting, by the first file server, that the second file server has suffered an error condition; and
means for processing, by the first file server, file service operations from a set of failover clients, the failover clients accessing the first file server by computing a network address associated with the first file server from a first symbolic name, the first symbolic name generated by appending a set text string to a second symbolic name of the second file server.

41. A computer-readable medium comprising program instructions executing for execution on a processor for the practice of a method for operating a computer failover system, the method having the steps of:
detecting, by a first file server, that a second file server has suffered an error condition; and
processing, by the first file server, file service operations from a set of failover clients, the failover clients accessing the first file server by computing a network address associated with the first file server from a first symbolic name, the first symbolic name generated by appending a set text string to a second symbolic name of the second file server.

* * * * *